US012400493B2

United States Patent
Yamada et al.

(10) Patent No.: US 12,400,493 B2
(45) Date of Patent: Aug. 26, 2025

(54) SYSTEM, METHOD, AND PROGRAM FOR VEHICLE DETERIORATION DETECTION

(71) Applicant: TOYOTA JIDOSHA KABUSHIKI KAISHA, Toyota (JP)

(72) Inventors: Yoshihisa Yamada, Nagoya (JP); Tomohiro Yokoyama, Toyota (JP); Taro Kawai, Toyota (JP); Takashi Miki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 17/973,994

(22) Filed: Oct. 26, 2022

(65) Prior Publication Data
US 2023/0162541 A1    May 25, 2023

(30) Foreign Application Priority Data
Nov. 19, 2021   (JP) .................................. 2021-188436

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01)

(58) Field of Classification Search
CPC ............................ G07C 5/0808; G07C 5/008
See application file for complete search history.

(56) References Cited

U.S. PATENT DOCUMENTS

| | | | |
|---|---|---|---|
| 2017/0202501 A1* | 7/2017 | Kuwahara | G06V 20/597 |
| 2018/0293815 A1* | 10/2018 | Wei | B60C 11/246 |
| 2019/0128917 A1* | 5/2019 | Watanabe | B60W 30/00 |
| 2019/0256103 A1 | 8/2019 | Capua et al. | |
| 2020/0380862 A1* | 12/2020 | Kakehi | G08G 1/096741 |
| 2022/0203783 A1* | 6/2022 | Maeda | B60C 11/246 |
| 2023/0202241 A1* | 6/2023 | Stewart | B60C 11/246 |
| | | | 701/32.1 |

FOREIGN PATENT DOCUMENTS

| | | |
|---|---|---|
| DE | 102016203545 A1 | 9/2017 |
| EP | 2405406 A1 | 1/2012 |

(Continued)

OTHER PUBLICATIONS

English translation of JP-2019190959-A (Year: 2019).*
English translation of JP-2006318127-A (Year: 2006).*
English translation of JP-3596050-B2 (Year: 2004).*

*Primary Examiner* — Navid Z. Mehdizadeh
*Assistant Examiner* — Matthew Ho
(74) *Attorney, Agent, or Firm* — Oliff PLC (57) ABSTRACT

A vehicle information processing method for calculating a feature related to an operation of a vehicle includes: receiving input information including at least one of information on a driving operation performed on the vehicle, information on an operating state of driver assistance of the vehicle, and information on a behavior of the vehicle; and calculating the feature by using the input information received during a predetermined period in which a predetermined condition is satisfied out of a period in which the input information is received. The predetermined condition includes a condition that a driving situation of the vehicle is a predetermined driving situation corresponding to the feature.

6 Claims, 7 Drawing Sheets

(56) References Cited

FOREIGN PATENT DOCUMENTS

| | | |
|---|---|---|
| FR | 2 660 270 A1 | 10/1991 |
| GB | 2 243 657 A | 11/1991 |
| JP | 2002-036837 A | 2/2002 |
| JP | 3596050 B2 * | 12/2004 |
| JP | 2006-130941 A | 5/2006 |
| JP | 2006318127 A * | 11/2006 |
| JP | 2011-201404 A | 10/2011 |
| JP | 2019190959 A * | 10/2019 |
| JP | 2021-046079 A | 3/2021 |
| WO | 2007/139493 A1 | 12/2007 |

\* cited by examiner

SYSTEM, METHOD, AND PROGRAM FOR VEHICLE DETERIORATION DETECTION

CROSS-REFERENCE TO RELATED APPLICATION

This application claims priority to Japanese Patent Application No. 2021-188436 filed on Nov. 19, 2021, incorporated herein by reference in its entirety.

BACKGROUND

1. Technical Field

The present disclosure relates to vehicle information processing devices, vehicle information processing methods, and non-transitory storage media. The present disclosure is used for, for example, a technique for estimating a change history of a vehicle using information obtained from the vehicle.

2. Description of Related Art

There is a technique for estimating the state of change of a vehicle (e.g., the state of deterioration of vehicle parts) using information obtained from sensors mounted on the vehicle. For example, Japanese Unexamined Patent Application Publication No. 2002-036837 (JP 2002-036837 A) discloses a technique for estimating the wear state of tires from the relationship between the acceleration or deceleration of a vehicle and the slip ratio.

SUMMARY

However, since the state of the vehicle may change significantly depending on disturbance and how the vehicle is driven, the estimated state of change of the vehicle may include noise caused by the disturbance and how the vehicle is driven. As a result, the state of change of the vehicle sometimes cannot be accurately be estimated. JP 2002-036837 A does not consider the noise caused by the disturbance and how the vehicle is driven.

The present disclosure provides a vehicle information processing device, vehicle information processing method, and non-transitory storage medium capable of accurately estimating the state of change of a vehicle.

A first aspect of the present disclosure is a vehicle information processing device configured to calculate a feature related to an operation of a vehicle. The vehicle information processing device includes one or more processors. The one or more processors are configured to: receive input information including at least one of information on a driving operation performed on the vehicle, information on an operating state of driver assistance of the vehicle, and information on a behavior of the vehicle; and calculate the feature by using the input information received during a predetermined period in which a predetermined condition is satisfied out of a period in which the one or more processors receive the input information. The predetermined condition includes a condition that a driving situation of the vehicle is a predetermined driving situation corresponding to the feature.

According to the first aspect, the feature can be calculated by excluding at least a part of the input information containing noise caused by disturbance and how the vehicle is driven. Therefore, the feature related to the operation of the vehicle can be accurately calculated as compared to the case where the feature is calculated using the input information received during the entire period in which the one or more processors receive input information. The state of change of the vehicle can thus be accurately estimated by using the feature.

In the first aspect, the one or more processors may be configured to generate information on a change of the vehicle by using information on a change in the feature over time during the period in which the predetermined condition is satisfied.

According to the above configuration, the state of change of the vehicle can be accurately estimated using the information of the change in the feature over time such as a sudden change or gradual change. Moreover, information that is valuable to a user regarding a change of the vehicle can be generated by performing, for example, concealment (e.g., statistic quantification) so that the individual cannot be identified.

In the first aspect, the predetermined condition may include a condition that the vehicle is making a turn with a magnitude of a steering angle being equal to or less than a first threshold value and the vehicle is accelerating or decelerating with a magnitude of acceleration being equal to or less than a second threshold value. The one or more processors may be configured to calculate, as the feature, a gradient of a linear function that approximates a slip ratio of a drive wheel of the vehicle with respect to a driving force of the vehicle.

According to the above configuration, the gradient of the linear function that approximates the slip ratio with respect to the driving force can be accurately calculated as the feature corresponding to tire flexibility in a driving situation of the vehicle in which the vehicle is making a gradual turn and is slowly accelerating or decelerating.

In the first aspect, the information on the change of the vehicle generated by the one or more processors may include, for example, at least one of information on a wear amount of a tire of the vehicle due to a gradual change in the feature and information on a replacement history of the tire due to a sudden change in the feature, when the feature related to the operation of the vehicle is calculated.

According to the above configuration, information variable to the user, namely either or both of the information on the wear amount of the tire due to a gradual change in the feature and the information on the replacement history of the tire due to a sudden change in the feature, can be generated.

In the first aspect, the predetermined condition may include a condition that a foot is being transferred between an accelerator pedal and a brake pedal of the vehicle in a predetermined traffic situation. The one or more processors may be configured to acquire a plurality of times required to transfer the foot between the accelerator pedal and the brake pedal, and calculate a time that appears most frequently out of times as the feature.

According to the above configuration, since the plurality of foot transfer times between the accelerator pedal and the brake pedal in the predetermined traffic situation is acquired, the foot transfer time that appears most frequently out of the foot transfer times can be accurately calculated as the feature corresponding to the driver's characteristics.

In the first aspect, the information on the change of the vehicle generated by the one or more processors may include, for example, at least one of information on a driver's level of proficiency in driving due to a gradual change in the feature and information on a change history of a driver due to a sudden change in the feature, when the feature related to the operation of the vehicle is calculated.

According to the above configuration, information variable to the user, namely either or both of the information on the driver's level of proficiency in driving due to a gradual change in the feature and information on the change history of the driver due to a sudden change in the feature, can be generated.

In the first aspect, the one or more processors may be configured to transmit the information on the change of the vehicle to outside of the vehicle.

According to the above configuration, since the information on the change of the vehicle can be transmitted to the outside of the vehicle, the utility value of the information on the change of the vehicle can be increased.

A second aspect of the present disclosure is a vehicle information processing method for calculating a feature related to an operation of a vehicle. The vehicle information processing method includes: receiving input information including at least one of information on a driving operation performed on the vehicle, information on an operating state of driver assistance of the vehicle, and information on a behavior of the vehicle; and calculating the feature by using the input information received during a predetermined period in which a predetermined condition is satisfied out of a period in which the input information is received. The predetermined condition includes a condition that a driving situation of the vehicle is a predetermined driving situation corresponding to the feature.

A third aspect of the present disclosure is a non-transitory storage medium storing instructions that are executable by one or more processors in a computer and that cause the one or more processors to perform functions. The functions include: receiving input information including at least one of information on a driving operation performed on a vehicle, information on an operating state of driver assistance of the vehicle, and information on a behavior of the vehicle; and calculating a feature related to an operation of the vehicle by using the input information received during a predetermined period in which a predetermined condition is satisfied out of a period in which the input information is received, the predetermined condition including a condition that a driving situation of the vehicle is a predetermined driving situation corresponding to the feature.

According to the first, second, and third aspects of the present disclosure, the vehicle information processing device, vehicle information processing method, and non-transitory storage medium capable of accurately estimating the state of change of a vehicle can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below in detail with reference to the drawings. The same or corresponding parts are denoted by the same reference signs throughout the drawings, and description thereof will not be repeated.

Figure 1:
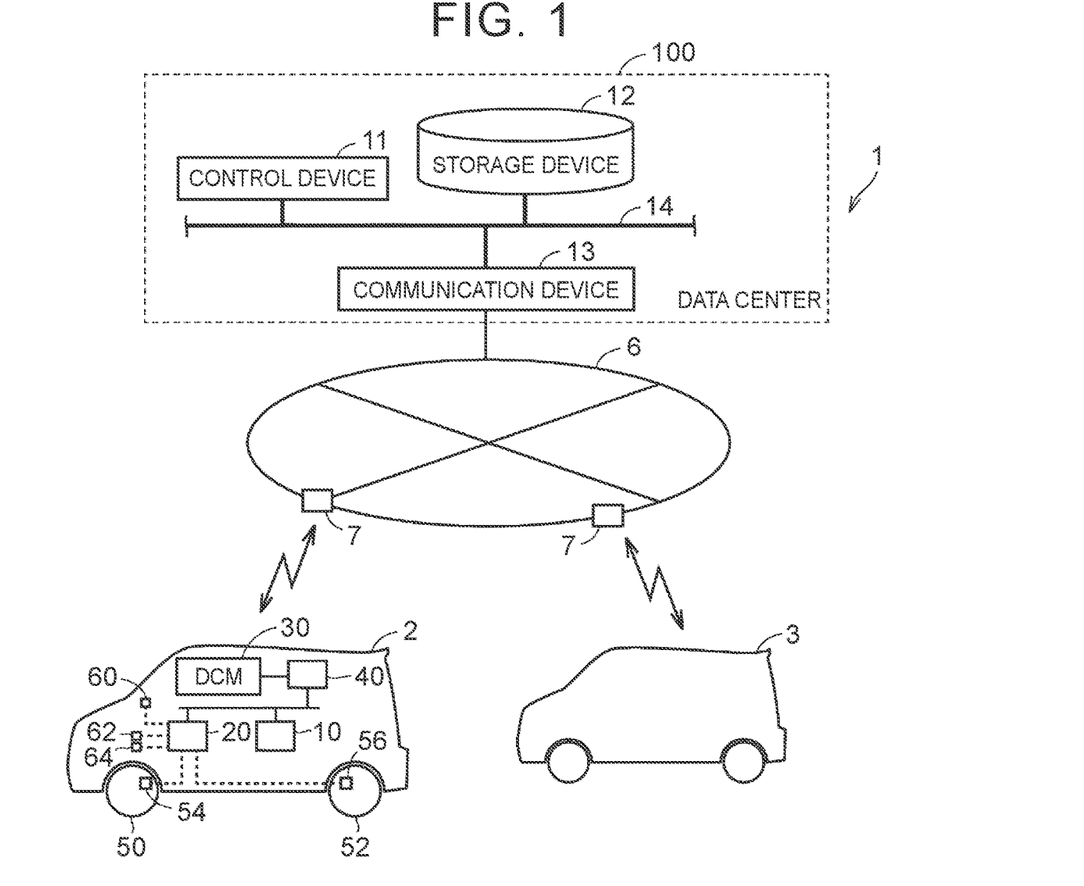
FIG. 1 illustrates an example of a configuration of a vehicle information management system.

FIG. 1 illustrates an example of a configuration of a vehicle information management system 1. As shown in FIG. 1, in the present embodiment, the vehicle information management system 1 includes a plurality of vehicles 2, 3, a communication network 6, a base station 7, and a data center 100.

The vehicles 2, 3 may be any vehicles capable of communicating with the data center 100. For example, the vehicles 2, 3 may be vehicles including an engine as a driving source, battery electric vehicles including an electric motor as a driving source, or hybrid electric vehicles including an engine and an electric motor and using either or both of the engine and the electric motor as a driving source. Although FIG. 1 shows only two vehicles 2, 3 for convenience of explanation, the number of vehicles is not particularly limited to two, and may be three or more.

The vehicle information management system 1 is configured to acquire predetermined information from the vehicles 2, 3 configured to communicate with the data center 100, and manage the acquired information.

The data center 100 includes a control device 11, a storage device 12, and a communication device 13. The control device 11, the storage device 12, and the communication device 13 are connected to each other via a communication bus 14 so that these devices 11, 12, and 13 can communicate with each other.

Although not shown in the figure, the control device 11 includes a central processing unit (CPU), a memory such as a read-only memory (ROM) and a random access memory (RAM), and an input and output port for inputting and outputting various signals. Various controls that are performed by the control device 11 are performed by software processing, that is, by the CPU reading a program stored in the memory. The various controls that are performed by the control device 11 can also be implemented by a general-purpose server (not shown) executing a program stored in a storage medium. However, the various controls that are performed by the control device 11 are not limited to the software processing, and may be performed by processing with dedicated hardware (electronic circuit).

The storage device 12 stores predetermined information on the vehicles 2, 3 configured to communicate with the data center 100. The predetermined information includes, for example, information on a feature of each vehicle 2, 3 that will be described later, and information identifying each vehicle 2, 3 (hereinafter referred to as vehicle identification (ID)). The vehicle ID is unique information set for each vehicle. The data center 100 can identify a sender vehicle by the vehicle ID.

The communication device 13 implements bidirectional communication between the control device 11 and the communication network 6. The data center 100 enables a plurality of vehicles including the vehicles 2, 3 to communicate with the data center 100 via base stations 7 provided on the communication network 6 by using the communication device 13.

Next, a specific configuration of the vehicles 2, 3 will be described. Since the vehicles 2, 3 basically have the same configuration, the configuration of the vehicle 2 will be representatively described below.

The vehicle 2 includes a drive wheel 50 and a driven wheel 52. When the drive wheel 50 is rotated by the operation of the driving source, a driving force acts on the vehicle 2 and the vehicle 2 moves accordingly.

The vehicle 2 further includes an advanced driver assistance system-electronic control unit (ADAS-ECU) 10, a brake ECU 20, a Data Communication Module (DCM) 30, and a central ECU 40.

The ADAS-ECU 10, the brake ECU 20, and the central ECU 40 are all computers including one or more processors, such as a CPU, that execute a program, a memory, and an input and output interface.

The ADAS-ECU 10 includes a driver assistance system having functions related to driver assistance of the vehicle 2. The driver assistance system is configured to implement various functions to assist in driving of the vehicle 2 including at least one of the following three controls of the vehicle 2 by running an application installed on the driver assistance system: steering control, drive control, and braking control. Examples of the application installed on the driver assistance system include an application that implements functions of an autonomous driving (AD) system, an application that implements functions of an automated parking system, and an application that implements functions of an advanced driver assistance system (ADAS) (hereinafter referred to as the "ADAS application").

For example, the ADAS application includes at least one of the following applications: an application that implements functions of vehicle following driving (adaptive cruise control (ACC) etc.) for maintaining a constant distance to a vehicle ahead, an application that implements functions of an auto speed limiter (ASL) for perceiving a speed limit and adapting the vehicle 2's maximum speed to the speed limit, an application that implements functions of lane keeping assistance (lane keeping assist (LKA), lane tracing assist (LTA), etc.) for keeping the vehicle 2 within its lane, an application that implements functions of collision damage reduction braking (autonomous emergency braking (AEB), pre-crash safety (PCS), etc.) for automatically braking the vehicle 2 in order to reduce damage from a collision, and an application that implements functions of lane deviation warning (lane departure warning (LDW), lane departure alert (LDA), etc.) for alerting a driver of the vehicle 2 that the vehicle 2 is deviating from its lane.

Each application on the driver assistance system outputs requests of a kinematic plan that guarantees merchantability (functionality) of the application alone to the brake ECU 20, based on, for example, information on vehicle surroundings acquired (input) from a plurality of sensors, not shown, and an assistance request from the driver. Examples of the sensors include a vision sensor such as a forward-facing camera, a radar, a light detection and ranging (LiDAR) sensor, and a position detection device.

Each application acquires, as perceived sensor information, information on vehicle surroundings obtained by integrating detection results from one or more sensors, and also acquires an assistance request from the driver via a user interface (not shown) such as a switch. For example, each application can perceive other vehicles, obstacles, or persons around the vehicle 2 by processing, using artificial intelligence (AI) or an image processor, images or videos of vehicle surroundings acquired by the sensors.

The kinematic plan includes, for example, a request related to longitudinal acceleration or deceleration to be generated in the vehicle 2, a request related to the steering angle of the vehicle 2, and a request related to brake holding of the vehicle 2.

The brake ECU 20 controls a brake actuator that generates a braking force in the vehicle 2 by using the detection results from the sensors. The brake ECU 20 also sets a motion request for the vehicle 2 that fulfills the requests of the kinematic plan from the ADAS-ECU 10. The motion request for the vehicle 2 set by the brake ECU 20 is fulfilled by an actuator system (not shown) mounted on the vehicle 2. The actuator system includes, for example, a plurality of types of actuator system such as a power train system, a brake system, and a steering system.

For example, a steering angle sensor 60, an accelerator pedal depression amount sensor 62, a brake pedal depression amount sensor 64, a first wheel speed sensor 54, and a second wheel speed sensor 56 are connected to the brake ECU 20.

The steering angle sensor 60 detects the steering angle. The steering angle sensor 60 transmits a signal indicating the detected steering angle to the brake ECU 20.

The accelerator pedal depression amount sensor 62 detects the depression amount of an accelerator pedal (not shown). The accelerator pedal depression amount sensor 62 transmits a signal indicating the detected depression amount of the accelerator pedal to the brake ECU 20.

The brake pedal depression amount sensor 64 detects the depression amount of a brake pedal (not shown). The brake pedal depression amount sensor 64 transmits a signal indicating the detected depression amount of the brake pedal to the brake ECU 20.

The first wheel speed sensor 54 detects the number of rotations (wheel speed) of the drive wheel 50. The first wheel speed sensor 54 transmits a signal indicating the detected number of rotations of the drive wheel 50 to the brake ECU 20.

The second wheel speed sensor 56 detects the number of rotations of the driven wheel 52. The second wheel speed sensor 56 transmits a signal indicating the detected number of rotations of the driven wheel 52 to the brake ECU 20.

The configuration in which the steering angle sensor 60, the accelerator pedal depression amount sensor 62, the brake pedal depression amount sensor 64, the first wheel speed sensor 54, and the second wheel speed sensor 56 are connected to the brake ECU 20 and directly transmit the detection results to the brake ECU 20 is illustrated as an example in FIG. 1. However, any of the sensors may be connected to other ECU, and the detection results of that sensor may be input to the brake ECU 20 via a communication bus or the central ECU 40.

For example, the brake ECU 20 receives information on the running state of various applications, receives information on other driving operations such as a shift range, and receives information on the behavior of the vehicle 2, in addition to the information on the kinematic plan from the ADAS-ECU 10.

The DCM 30 is a communication module configured to bidirectionally communicate with the data center 100.

The central ECU 40 is configured to communicate with, for example, the brake ECU 20, and is also configured to communicate with the data center 100 using the DCM 30. For example, the central ECU 40 transmits information received from the brake ECU 20 to the data center 100 via the DCM 30.

In the present embodiment, the central ECU 40 is described as an ECU that transmits information received from the brake ECU 20 to the data center 100 via the DCM 30. However, for example, the central ECU 40 may be an ECU having a function to relay communication between various ECUs (gateway function), or may be an ECU that includes a memory (not shown) whose stored content can be updated using update information received from the data center 100, and from which predetermined information including update information stored from various ECUs to the memory upon starting of the system of the vehicle 2 is read.

In the vehicle 2 having such a configuration, the brake ECU 20 can, for example, estimate the state of change of the vehicle 2 (e.g., the state of deterioration of parts of the vehicle 2) using information obtained from the sensors mounted on the vehicle 2. However, since the state of the vehicle 2 may change significantly depending on disturbance and how the vehicle 2 is driven, the estimated state of change of the vehicle 2 may include noise caused by the disturbance and how the vehicle 2 is driven. As a result, the state of change of the vehicle 2 sometimes cannot be accurately be estimated.

Therefore, in the present embodiment, the brake ECU 20 receives input information including at least one of the following pieces of information: information on the driving operation performed on the vehicle 2, information on the operating state of the driver assistance of the vehicle 2, and information on the behavior of the vehicle 2. The brake ECU 20 calculates a feature related to the operation of the vehicle 2 using the input information received during a period in which a predetermined condition is satisfied out of a period in which the brake ECU 20 receives input information. It is herein assumed that the predetermined condition includes a condition that the driving situation of the vehicle 2 is a predetermined driving situation corresponding to the feature.

The feature can thus be calculated by excluding at least a part of the input information containing noise caused by the disturbance and how the vehicle 2 is driven. Therefore, the feature related to the operation of the vehicle 2 can be accurately calculated as compared to the case where the feature is calculated using the input information received during the entire period in which the brake ECU 20 receives input information.

Figure 2:
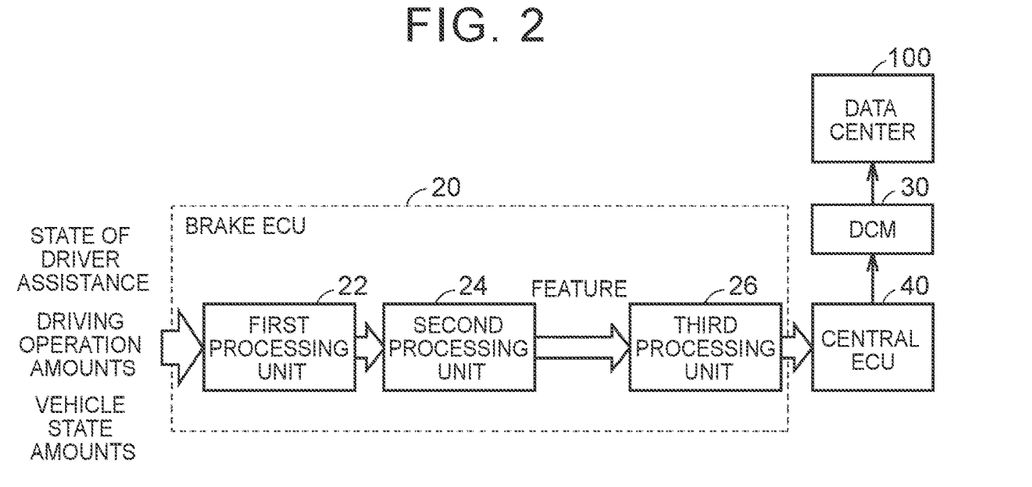
FIG. 2 illustrates a configuration of an example of a vehicle information processing device according to an embodiment.

FIG. 2 illustrates a configuration of an example of a vehicle information processing device according to the present embodiment. The vehicle information processing device according to the present embodiment is implemented by the brake ECU 20.

The brake ECU 20 includes a first processing unit 22, a second processing unit 24, and a third processing unit 26. The first processing unit 22 receives information indicating the depression amount of the accelerator pedal and information indicating the depression amount of the brake pedal as the information on the driving operation performed on the vehicle 2. The first processing unit 22 also receives information indicating requests of a kinematic plan from the ADAS-ECU 10 and the operating state of the driver assistance system as the information on the operating state of the driver assistance of the vehicle 2. The first processing unit 22 also receives information indicating the detection results from various sensors as the information on the behavior of the vehicle 2. The first processing unit 22 outputs input information received during the period in which the predetermined condition is satisfied out of the period in which the first processing unit 22 receives input information to the second processing unit 24.

The second processing unit 24 calculates a feature related to the operation of the vehicle 2 by using the input information received during the period in which the predetermined condition is satisfied out of the period in which the first processing unit 22 receives input information.

Figure 3:
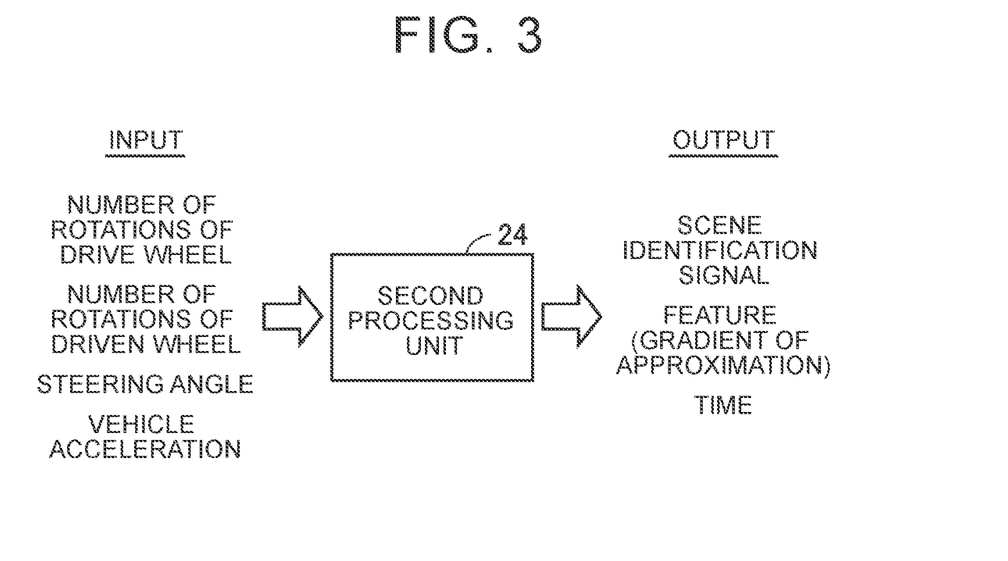
FIG. 3 illustrates an example of a process that is performed by a second processing unit.

FIG. 3 illustrates an example of a process that is performed by the second processing unit 24. As shown in FIG. 3, the number of rotations of the drive wheel 50, the number of rotations of the driven wheel 52, the steering angle, and the vehicle acceleration are input from the first processing unit 22 to the second processing unit 24 as input information. The second processing unit 24 determines whether the predetermined condition is satisfied by using the input information.

The predetermined condition includes a condition that the driving situation of the vehicle 2 is a predetermined driving situation corresponding to the feature. The predetermined condition is set in advance based on the calculated feature. In the present embodiment, the feature indicates, for example, the flexibility of a tire of the vehicle 2, and indicates the gradient (slope) of a linear approximation of the slip ratio with respect to the driving force of the vehicle 2. In the present embodiment, the second processing unit 24 calculates the slip ratio by, for example, subtracting 1 from the number of rotations of the drive wheel 50 divided by the number of rotations of the driven wheel 52. The method for calculating the slip ratio is not particularly limited to the above calculation method. The second processing unit 24 may calculate the driving force of the vehicle 2 from the acceleration of the vehicle 2 and the weight of the vehicle 2, or may calculate the driving force of the vehicle 2 using, for example, the driving torque applied from the driving source to the drive wheel 50 and the tire diameter and running resistance of the drive wheel 50.

The predetermined condition is set by assuming a driving situation in which noise caused by disturbance or how the vehicle 2 is driven can be eliminated in order to calculate the gradient. The predetermined condition is set by assuming, for example, a driving situation that allows the feature to be accurately calculated, such as a driving situation in which the tire is stably gripping. Therefore, the predetermined condition is not particularly limited to the above driving situation.

In the present embodiment, the predetermined condition includes, for example, a condition that the vehicle 2 is making a turn with the magnitude of the steering angle being equal to or less than a first threshold value and the vehicle 2 is accelerating or decelerating with the magnitude of the acceleration (time derivative of the velocity of the vehicle 2 obtained from the number of rotations of the driven wheel 52) being equal to or less than a second threshold value.

When the second processing unit 24 determines that the predetermined condition is satisfied, the second processing unit 24 sets a flag indicating whether the predetermined condition is satisfied. The second processing unit 24 outputs a signal indicating the state of the flag as a scene identification signal.

When the second processing unit 24 determines that the predetermined condition is satisfied, the second processing unit 24 calculates the feature related to the operation of the vehicle 2 by using the input information received during the period in which the predetermined condition is satisfied. For example, when the predetermined condition is satisfied, the second processing unit 24 calculates the slip ratio with respect to the driving force of the vehicle 2, and stores (saves) the calculated value in a memory in such a manner that the calculated value is associated with time. The second processing unit 24 repeatedly performs such a process during the period in which the predetermined condition is satisfied. The second processing unit 24 calculates a linear approximation of the slip ratio with respect to the driving force of the vehicle 2 by using a change history of the slip ratio with respect to the driving force of the vehicle 2 obtained by repeatedly performing the above process. For example, the second processing unit 24 calculates a linear approximation of the slip ratio with respect to the driving force of the vehicle 2 by using the least squares method. This calculation of a linear approximation using the least squares method need only be performed by a predetermined method, and detailed description thereof will not be given. The second processing unit 24 calculates the gradient (slope) of the calculated linear approximation as a feature. Every time the second processing unit 24 calculates a slip ratio with respect to the driving force, the second processing unit 24 calculates a linear approximation using a change history including the calculated slip ratio with respect to the driving force, calculates a feature, and outputs the calculated feature together with the scene identification signal and the time.

The third processing unit 26 generates information on a change of the vehicle 2 using the information output from the second processing unit 24. For example, the third processing unit 26 generates information on a change of the vehicle 2 using the information output from the second processing unit 24 when the state of the flag included in the scene identification signal is a predetermined state (e.g., on state).

Figure 4:
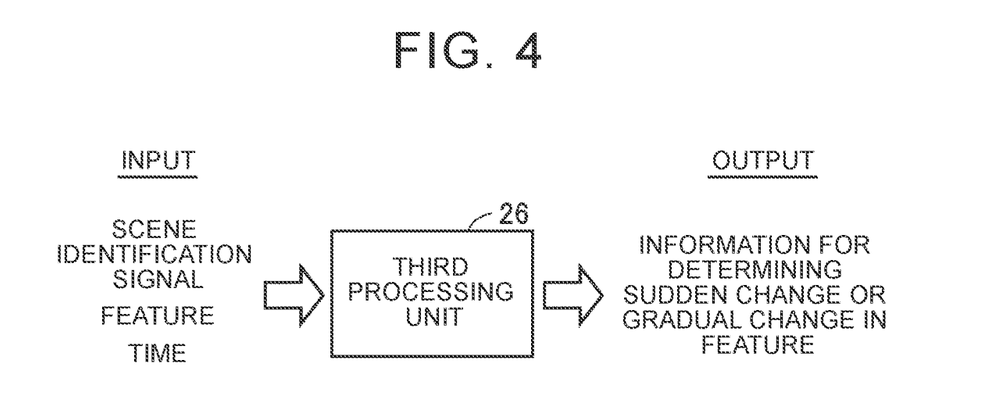
FIG. 4 illustrates an example of a process that is performed by a third processing unit.

FIG. 4 illustrates an example of a process that is performed by the third processing unit 26. As shown in FIG. 4, information indicating the scene identification signal, the feature, and the time is input from the second processing unit 24 to the third processing unit 26.

The third processing unit 26 outputs information necessary for the data center 100 to determine whether a change history of the feature corresponds to a predetermined state. Specifically, the third processing unit 26 statistically quantifies, for example, the amount of change in gradient per unit time (e.g., creates a history of the amount of change in gradient with respect to the traveled distance, with the abscissa representing the traveled distance and the ordinate representing the amount of change in gradient). The third processing unit 26 outputs the generated information to the central ECU 40.

The central ECU 40 transmits the information input from the third processing unit 26 to the data center 100 via the DCM 30.

When the output value of the third processing unit 26 suddenly changes and becomes larger than a threshold value A, the data center 100 determines that the change history of the feature corresponds to the state in which the tire has been replaced. In this case, the third processing unit 26 generates information indicating that the tire has been replaced in the vehicle 2.

On the other hand, for example, when the amount of change in gradient per unit time is equal to or less than the threshold value A, the data center 100 determines that the change history of the feature does not correspond to the state in which the tire has been replaced. In this case, the data center 100 determines that tire performance (flexibility) has deteriorated over time. Information indicating that the tire performance has deteriorated over time may include, for example, information indicating the degree of deterioration in tire performance with respect to the tire performance at a predetermined point in time (when the tire was new or when the tire was replaced).

Information that is transmitted from the DCM 30 to the data center 100 includes, for example, processing time, traffic scene identification numbers, and features (there is a plurality of sets of a traffic scene identification number and a feature). Therefore, the data center 100 stores the information input from the DCM 30 in the storage device 12 with the processing time, traffic scene identification number, and feature being as one set of data. The data center 100 can thus acquire a statistic of a change in tire performance and a statistic of a change in driving behavior characteristics of the driver of each vehicle 2, 3 capable of communicating with the data center 100.

Figure 5:
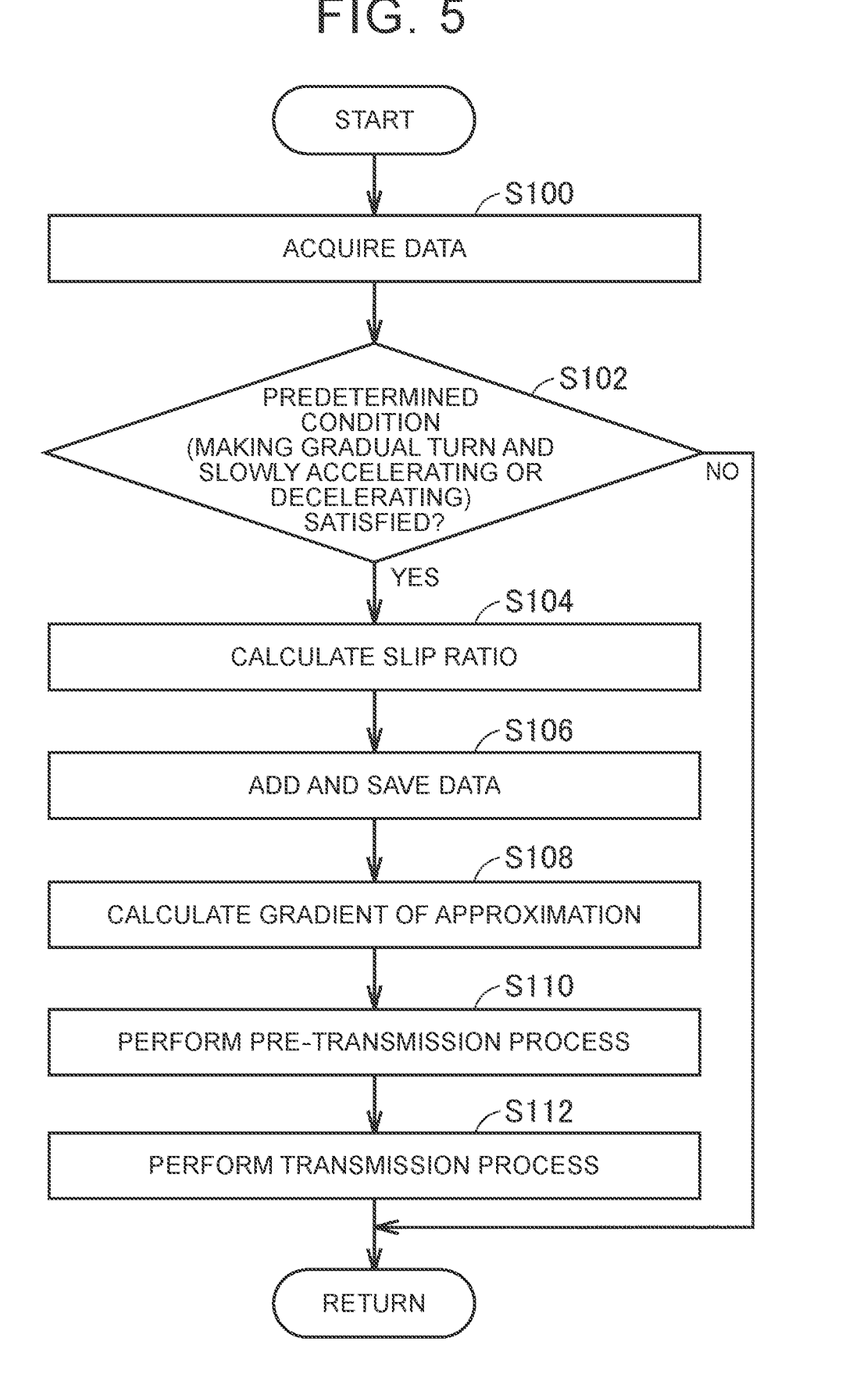
FIG. 5 is a flowchart showing an example of a process that is performed by a brake electronic control unit (ECU)

Next, an example of a process that is performed by the brake ECU 20 of the vehicle 2 will be described with reference to FIG. 5. FIG. 5 is a flowchart showing an example of the process that is performed by the brake ECU 20. A series of steps shown in this flowchart is repeatedly performed by the brake ECU 20 at predetermined control cycles.

In step (hereinafter referred to as "S") 100, the brake ECU 20 acquires data corresponding to input information. Specifically, the brake ECU 20 acquires data corresponding to input information including, for example, information on the steering angle (e.g., the steering wheel angle), information on the acceleration of the vehicle 2, information on the number of rotations of the drive wheel 50, and information on the number of rotations of the driven wheel 52.

In S102, the brake ECU 20 determines whether a predetermined condition is satisfied. The predetermined condition includes, for example, a condition that the magnitude of the steering angle is within a first range and the magnitude of the acceleration of the vehicle 2 is within a second range. The lower limit value of the first range is larger than zero, and the upper limit value of the first range is at least a value indicating that the vehicle 2 is making a gradual turn. Similarly, the lower limit value of the second range is larger than zero, and the upper limit value of the second range is at least a value indicating that the vehicle 2 is slowly accelerating or decelerating. The first range and the second range are adapted by, for example, experiments etc., and are set in advance in consideration of the calculation accuracy of the feature. When the brake ECU 20 determines that the predetermined condition is satisfied (YES in S102), the routine proceeds to S104.

In S104, the brake ECU 20 calculates the slip ratio with respect to the driving force of the vehicle 2. Since the method for calculating the slip ratio with respect to the driving force of the vehicle 2 is as described above, detailed description thereof will not be repeated.

In S106, the brake ECU 20 adds and saves data. The brake ECU 20 stores the slip ratio calculated in S104 and its corresponding driving force in the memory as added data in such a manner that the slip ratio and its corresponding driving force are associated with their corresponding time. The brake ECU 20 may erase from the memory the data on any slip ratio corresponding to the time that is when or before the slip ratio was calculated most recently and that is outside a predetermined period.

In S108, the brake ECU 20 calculates the gradient of a linear approximation. The brake ECU 20 calculates a linear approximation from a plurality of pieces of data on the slip ratio with respect to the driving force of the vehicle 2 stored in the memory by using, for example, the least squares method, and calculates a value corresponding to the slope of the calculated linear approximation as the gradient. The above steps S100, S102, S104, S106, and S108 correspond to the process that is performed by the second processing unit 24.

In S110, the brake ECU 20 performs a pre-transmission process. The brake ECU 20 generates information necessary for the data center 100 to determine whether a change history of the feature corresponds to a predetermined state. For example, the brake ECU 20 statistically quantifies the amount of change in gradient per unit time as described above.

In S112, the brake ECU 20 performs a transmission process. The brake ECU 20 transmits the generated information to the central ECU 40. The central ECU 40 transmits the received information to the data center 100 via the DCM 30. The above steps S110, S112 correspond to the process that is performed by the third processing unit 26. The data center 100 determines, by using the received information, whether the change history of the feature corresponds to the state in which the tire has been replaced, as described above. Since the information that is transmitted to the data center 100 and the process that is performed in the data center 100 are as described above, detailed description thereof will not be repeated.

Figure 6:
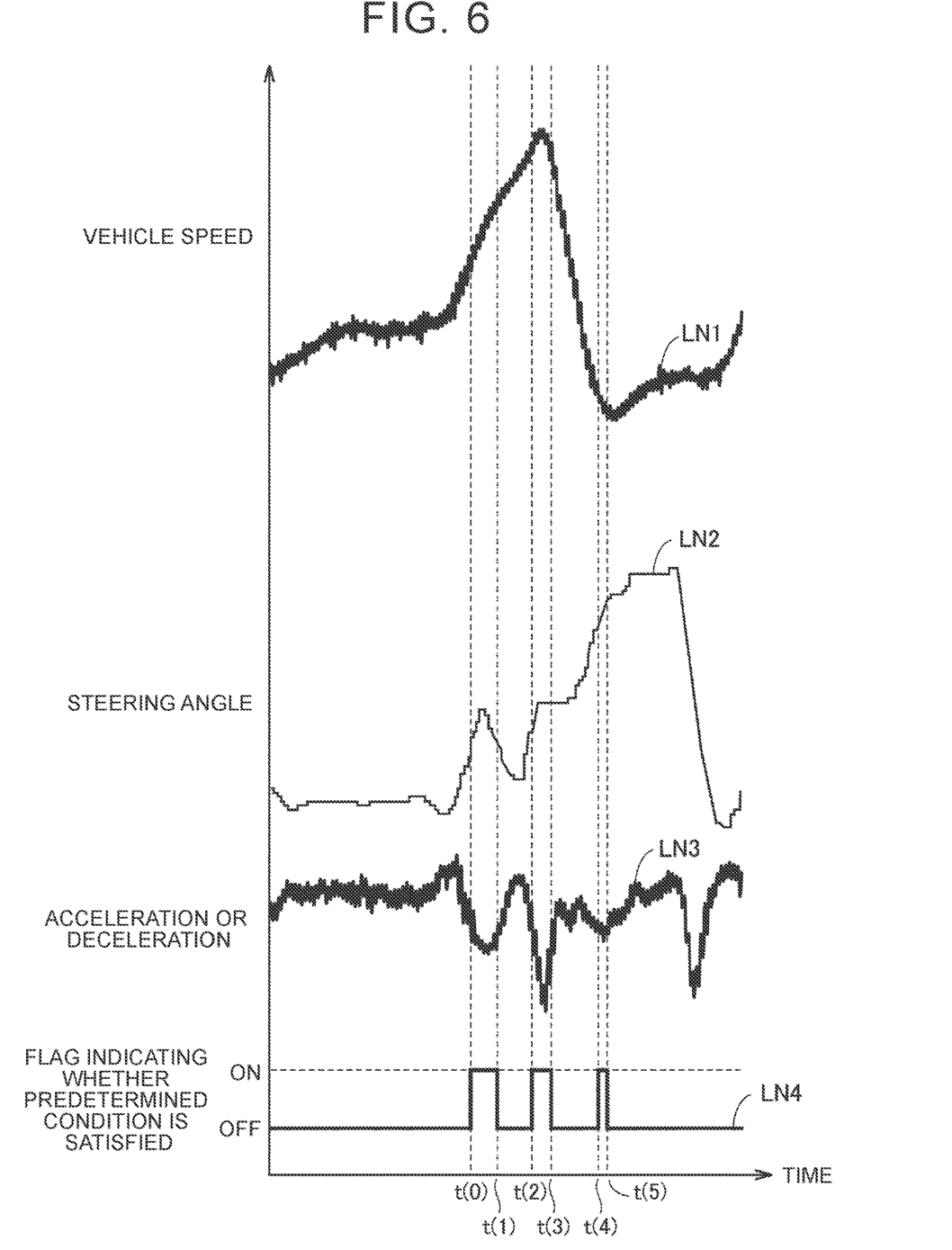
FIG. 6 is a graph showing an example of a change history of a behavior of a vehicle and a change history of a flag indicating whether a predetermined condition is satisfied.

The operation of the brake ECU 20, namely the vehicle information processing device according to the present embodiment, based on the above structure and flowchart will be described with reference to FIGS. 6, 7, 8 and 9. FIG. 6 is a graph showing an example of a change history of the behavior of the vehicle 2 and a change history of the flag indicating whether the predetermined condition is satisfied. The ordinate of FIG. 6 represents the vehicle speed, the steering angle, the acceleration, and the flag indicating whether the predetermined condition is satisfied. The abscissa of FIG. 6 represents time. LN1 in FIG. 6 shows an example of a change in vehicle speed. LN2 in FIG. 6 shows an example of a change in steering angle. LN3 in FIG. 6 shows an example of a change in acceleration of the vehicle 2. LN4 in FIG. 6 shows an example of a change in flag indicating whether the predetermined condition is satisfied.

For example, the vehicle 2 is accelerating and moving straight during the period up to time t(0). Therefore, even when data corresponding to the input information is acquired in this period (S100), the slip ratio will not be calculated because the predetermined condition is not satisfied (NO in S102).

On the other hand, when data corresponding to the input information is acquired at time t(0) (S100), it is determined that the predetermined condition is satisfied (YES in S102) because the magnitude of the steering angle is within the first range and the magnitude of the acceleration is within the second range. Therefore, the slip ratio with respect to the driving force of the vehicle 2 is calculated (S104). Accordingly, the calculated slip ratio and the driving force of the vehicle 2 are associated with time t(0) and saved as added data (S106). The gradient of a linear approximation is then calculated using a plurality of pieces of added data on the slip ratio with respect to the driving force of the vehicle 2 (S108). Similarly, when it is determined in the period from time t(0) to time t(1), the period from time t(2) to time t(3), and the period from time t(4) to time t(5) that the predetermined condition is satisfied, the slip ratio is calculated, and the calculated slip ratio and the driving force of the vehicle 2 are saved as added data and are used to calculate the gradient of a linear approximation.

Figure 7:
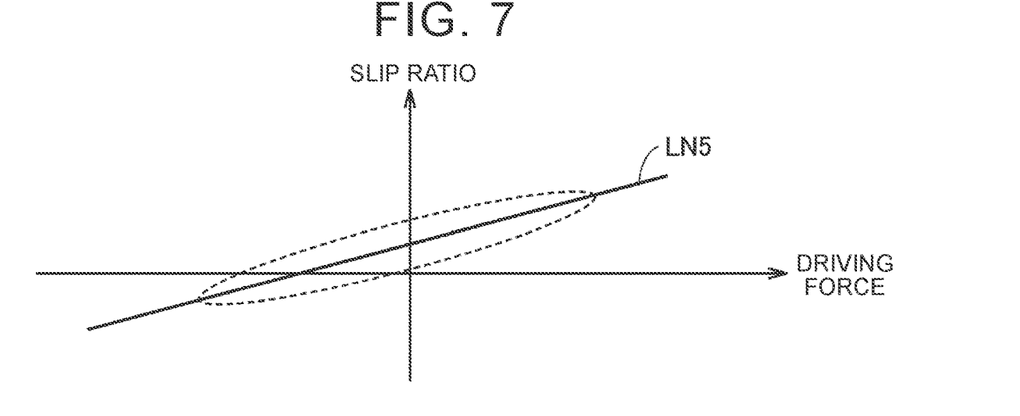
FIG. 7 is a graph illustrating an example of a method for calculating the gradient of a linear approximation.

FIG. 7 is a graph illustrating an example of a method for calculating the gradient of a linear approximation. The abscissa of FIG. 7 represents the driving force. The ordinate of FIG. 7 represents the slip ratio. LN5 in FIG. 7 shows a straight line corresponding to a linear approximation. When a plurality of pieces of data on the slip ratio with respect to the driving force of the vehicle 2 is plotted as points on a coordinate system with the ordinate representing the driving force and the abscissa representing the slip ratio, a data group distributed inside and around the area surrounded by a dashed line in FIG. 7 is obtained. When a linear approximation is calculated by, for example, the least squares method using these pieces of data, the calculated linear approximation represents such a straight line as shown by LN5 in FIG. 7. The value corresponding to the slope of this linear approximation is calculated as a gradient. When the gradient is calculated, the pre-transmission process is performed using the calculated gradient (S110). For example, the amount of change between the current gradient and the gradient obtained a predetermined amount of time before the current time is calculated in the pre-transmission process.

Figure 8:
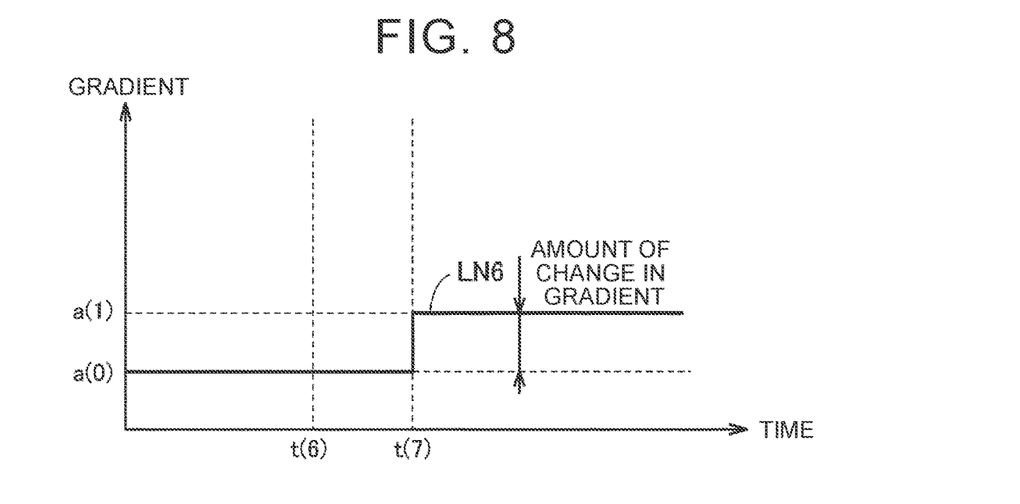
FIG. 8 is a graph showing an example of a change in gradient of the linear approximation.

FIG. 8 is a graph showing an example of a change in gradient of the linear approximation. The abscissa of FIG. 8 represents time. The ordinate of FIG. 8 represents the gradient of the linear approximation. LN6 in FIG. 8 shows an example of a change in gradient of the linear approximation.

For example, it is assumed that the current time is time t(7), and time t(6) is the predetermined amount of time before the current time. In this case, when the gradient at time t(6) is a(0) and the gradient at time t(7) is a(1), the value of "a(1)–a(0)" is calculated as the amount of change in gradient per unit time ("time t(7)–time t(6)"=the predetermined amount of time). When the amount of change in gradient per unit time is, for example, larger than the threshold value A, this corresponds to the state in which the feature has suddenly changed, and information indicating that the tire has been replaced is generated.

Figure 9:
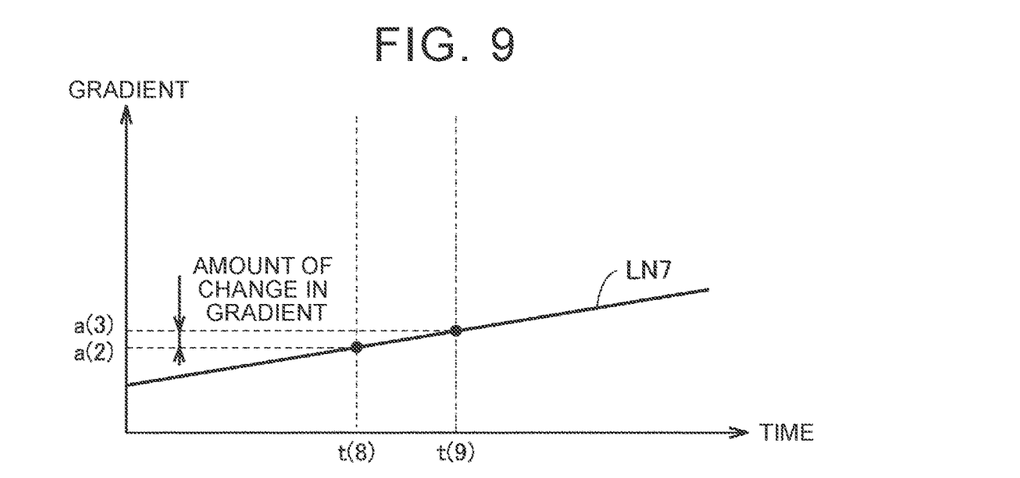
FIG. 9 shows another example of a change in gradient of the linear approximate.

FIG. 9 is a graph showing another example of a change in gradient of the linear approximation. The abscissa of FIG. 9 represents time. The ordinate of FIG. 9 represents the gradient of the linear approximation. LN7 in FIG. 9 shows another example of a change in gradient of the linear approximation.

For example, it is assumed that the current time is time t(9), and time t(8) is the predetermined amount of time before the current time. In this case, when the gradient at time t(8) is a(2) and the gradient at time t(9) is a(3), the value of "a(3)–a(2)" is calculated as the amount of change in gradient per unit time ("time t(9)–time (8)"=the predetermined amount of time). When the amount of change in gradient per unit time is, for example, equal to or less than the threshold value A, this corresponds to the state in which the feature has changed gradually. In this case, the tire has not been replaced, and information indicating that the tire performance has deteriorated over time is generated. At this time, for example, the ratio of "a(3)–a(2)" to a(2) is calculated as a deterioration rate, and is generated as information indicating that the tire performance has deteriorated over time.

As described above, according to the vehicle information processing device of the present embodiment, the gradient of the linear approximation of the slip ratio with respect to the driving force, namely the feature, is calculated using the input information received during the period in which the predetermined condition is satisfied. The feature can thus be calculated by excluding at least a part of the input information containing noise caused by the disturbance and how the vehicle is driven. Therefore, the feature related to the operation of the vehicle can be accurately calculated as compared to the case where the feature is calculated using the input information received during the entire period in which the vehicle information processing device receives input information. A vehicle information processing device, vehicle information processing method, and non-transitory storage medium capable of accurately estimating the state of change of a vehicle can thus be provided.

In addition, by using information on a change in feature (gradient) indicating the tire flexibility over time such as a sudden change or gradual change, information that is valuable to the user regarding a change of the vehicle such as a tire replacement history or a tire performance deterioration history can be calculated while performing concealment so that the individual cannot be identified.

Moreover, since a linear approximation of the slip ratio with respect to the driving force is calculated in a driving situation in which the vehicle is making a gradual turn and slowly accelerating or decelerating, namely in a driving situation in which stable tire grip is obtained, the feature corresponding to the tire flexibility can be accurately calculated.

Furthermore, since information on a change of the vehicle for determining the tire replacement history, the tire performance deterioration history, etc. can be transmitted from the DCM 30 that is a transmission unit to the outside of the vehicle, the utility value of the information on the change of the vehicle can be increased.

Moreover, when the feature is calculated in the vehicle, it is not necessary to transmit information for calculating the feature to the outside of the vehicle. This reduces transmission of unnecessary information to the outside of the vehicle when, for example, the amount of information for calculating the feature is large, and thus reduces an increase in communication load and reduces the storage capacity and processing cost for the data center.

Moreover, since calculation of the feature and calculation of the change history of the feature are separately performed by the second processing unit 24 and the third processing unit 26, only the method for calculating the change history of the feature that is performed by the third processing unit 26 can be changed and used to generate information on a change of other vehicle. This change of the method for calculating the change history of the feature can be implemented by, for example, the brake ECU 20 reading the update information received from the data center 100 and stored in the memory of the central ECU 40.

Modifications will be described below.

In the above embodiment, the amount of change in gradient per unit time is calculated. However, for example, the amount of change in gradient per unit traveled distance may be calculated. The brake ECU 20 may calculate the traveled distance using, for example, the accumulated value of the number of rotations of the wheel (drive wheel 50 or driven wheel 52) in the direction of travel of the vehicle 2, the radius of the tire, etc.

In the above embodiment, the slip ratio is calculated using the number of rotations of one drive wheel 50 and the number of rotations of one driven wheel 52. However, the slip ratio may be calculated using the number of rotations of the other drive wheel and the number of rotations of the other driven wheel, and the feature and the change history of the feature may be calculated for each side.

An example in which the input information input to the brake ECU 20 is subjected to the process of the flowchart of FIG. 5 inside the brake ECU 20 to perform calculation of the feature and calculation of the change history of the feature. However, this process may be performed in the data center 100.

In the above embodiment, the data center 100 may receive information on a change of a vehicle from a plurality of vehicles without identifying a sender vehicle by the processing time and the traffic scene identification number.

In the above embodiment, the second processing unit 24 calculates a linear approximation of the change history of the slip ratio with respect to the driving force by using the least squares method, and calculates the gradient of the calculated linear approximation as a feature. However, the second processing unit 24 may calculate the feature using artificial intelligence (AI) such as machine learning. For example, the second processing unit 24 may calculate a linear approximation from the change history of the slip ratio with respect to the driving force by linear regression using machine learning, and calculate the gradient of the calculated linear approximation as a feature.

In the above embodiment, the gradient of a linear approximation calculated using the slip ratio with respect to the driving force of the vehicle 2 during the period in which the predetermined condition is satisfied is described as an example of the feature, and information on whether there is a tire replacement history and information on deterioration in tire performance are generated using the change history of the feature. However, the feature is not particularly limited to this gradient.

For example, the time it takes to transfer the foot between the accelerator pedal and the brake pedal (hereinafter sometimes referred to as the "AB foot transfer time") acquired during the period in which the predetermined condition is satisfied may be calculated as a feature, and information on a change of the vehicle may be generated by using the change history of the feature.

The predetermined condition includes, for example, a condition that the foot is being transferred between the accelerator pedal and the brake pedal of the vehicle 2 in a predetermined traffic situation. The predetermined traffic situation is a traffic situation in which the driver depressing the brake pedal transfers his or her foot from the brake pedal to the accelerator pedal while the vehicle 2 is moving. For example, the predetermined traffic situation includes a traffic situation in which brake lights of a vehicle ahead turn off while the driver is depressing the brake pedal, and the distance to the vehicle ahead is increasing. Alternatively, the predetermined traffic situation is a traffic situation in which the driver depressing the accelerator pedal transfers his or her foot from the accelerator pedal to the brake pedal while the vehicle 2 is moving. For example, the predetermined traffic situation includes a traffic situation in which a traffic light ahead turns from green to red while the driver is depressing the accelerator pedal. The brake ECU 20 can acquire, for example, information on whether there is a vehicle ahead of the vehicle 2, the distance to the vehicle ahead of the vehicle 2, or the color of a traffic light by obtaining the analysis results of an image acquired by a forward-facing camera. The image analysis may be performed by the brake ECU 20 or may be performed by other ECU.

The information on a change of the vehicle includes either or both of information on the driver's level of proficiency in driving due to a gradual change in mode time of the AB foot transfer time and information on a driver change history due to a sudden change in mode time of the AB foot transfer time.

Figure 10:
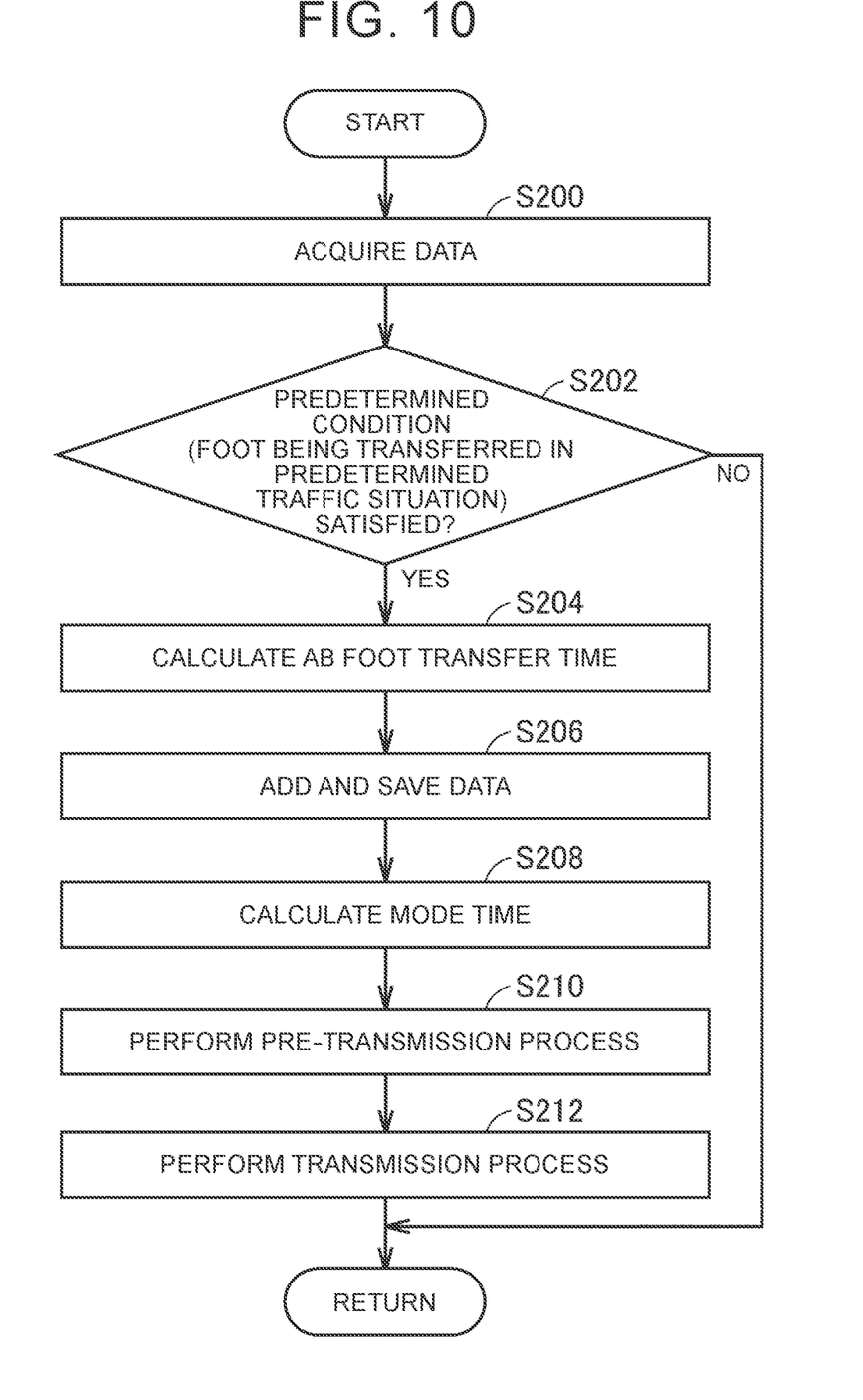
FIG. 10 is a flowchart showing an example of a process that is performed by a brake ECU in a modification.

Next, an example of a process that is performed by the brake ECU 20 of the vehicle 2 in this modification will be described with reference to FIG. 10. FIG. 10 is a flowchart showing an example of the process that is performed by the brake ECU 20 in the modification.

In S200, the brake ECU 20 acquires data corresponding to input information. Specifically, the brake ECU 20 acquires data corresponding to input information including, for example, information on the acceleration of the vehicle 2, image capturing information from the forward-facing camera that captures an image of the area ahead of the vehicle 2, information on the depression amount of the accelerator pedal, and information on the depression amount of the brake pedal. The brake ECU 20 acquires, for example, the image capturing information of the forward-facing camera from the ADAS-ECU 10.

In S202, the brake ECU 20 determines whether the predetermined condition is satisfied. Since the predetermined condition is as described above, detailed description thereof will not be repeated. When the brake ECU 20 determines that the predetermined condition is satisfied (YES in S202), the routine proceeds to S204.

In S204, the brake ECU 20 calculates the AB foot transfer time. For example, the brake ECU 20 starts timing with a timer when the depression amount of the accelerator pedal changes from a value larger than a first threshold value to a value equal to or less than the first threshold value (when the accelerator pedal is released). The brake ECU 20 may end timing when, for example, the depression amount of the brake pedal changes from a value equal to or less than a second threshold value to a value larger than the second threshold value, and thus calculate the time it takes to transfer the foot from the accelerator pedal to the brake pedal as the AB foot transfer time.

Alternatively, the brake ECU 20 starts timing with a timer when, for example, the depression amount of the brake pedal changes from a value larger than the second threshold value to a value equal to or less than the second threshold value. The brake ECU 20 may end timing when, for example, the depression amount of the accelerator pedal changes from a value equal to or less than the first threshold value to a value larger than the first threshold value, and thus calculate the time it takes to transfer the foot from the brake pedal to the accelerator pedal as the AB foot transfer time.

In S206, the brake ECU 20 adds and saves data. The brake ECU 20 stores the AB foot transfer time calculated in S204 in the memory as added data in such a manner that the AB foot transfer time is associated with its corresponding time.

In S208, the brake ECU 20 calculates the mode time. The brake ECU 20 calculates the AB foot transfer time that appears most frequently (has the highest count) in data on a plurality of AB foot transfer times acquired as data. The brake ECU 20 may erase from the memory the data on any mode time corresponding to the time that is when or before the mode time was calculated most recently and that is outside a predetermined period.

Figure 11:
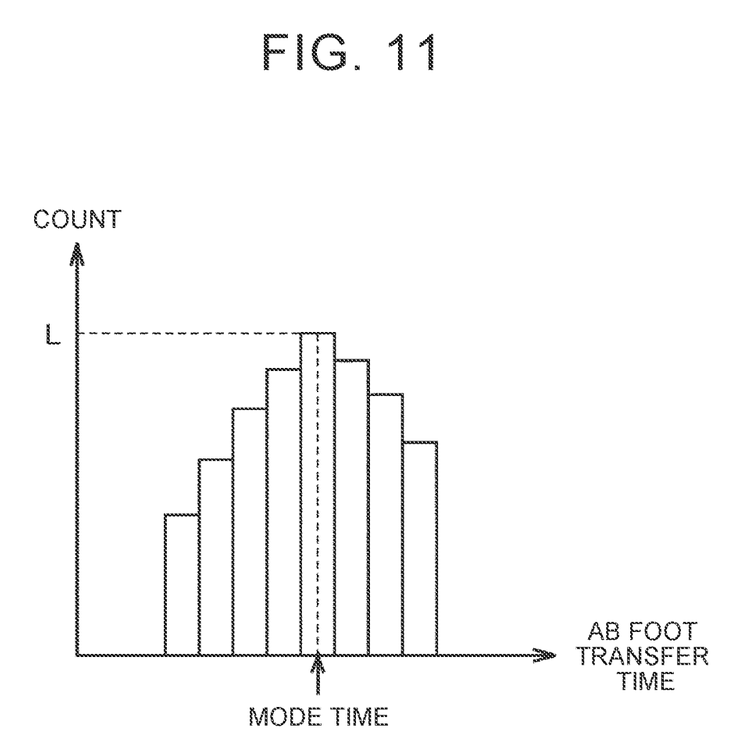
FIG. 11 is a graph illustrating an example of a method for calculating mode time.

FIG. 11 is a graph illustrating an example of a method for calculating the mode time. The ordinate of FIG. 11 represents frequency. The abscissa of FIG. 11 represents mode time. As shown in FIG. 11, for example, the brake ECU 20 divides the foot transfer time into a plurality of time intervals of a predetermined length, classifies a plurality of AB foot transfer times into groups corresponding to the time intervals, and counts how many pieces of data on the AB foot transfer time fall into each time interval. The brake ECU 20 sets the time interval with the highest count (L in FIG. 11) out of the time intervals as the mode time interval, and calculates, for example, the median of the mode time interval as the mode time. The above steps S200, S202, S204, S206, and S208 correspond to the process that is performed by the second processing unit 24 in this modification.

In S210, the brake ECU 20 performs a pre-transmission process. The brake ECU 20 generates information necessary for the data center 100 to determine whether a change history of the feature corresponds to a predetermined state. The brake ECU 20 statistically quantifies, for example, the amount of change in mode time per unit time (e.g., creates a history of the amount of change in mode time with respect to the traveled distance, with the abscissa representing the traveled distance and the ordinate representing the amount of change in mode time).

In S212, the brake ECU 20 performs a transmission process. The brake ECU 20 transmits the generated information to the central ECU 40. The central ECU 40 transmits the received information to the data center 100 via the DCM 30. The above steps S210, S212 correspond to the process that is performed by the third processing unit 26 in this modification.

The data center 100 determines, by using the received information, whether the change history of the feature corresponds to the state in which the level of proficiency in driving has decreased or increased, or corresponds to the state in which the driver has been changed. As a more specific example, the data center 100 determines whether the amount of change in mode time per unit time is larger than a threshold value B. When the data center 100 determines that the amount of change in mode time per unit time is larger than the threshold value B, the data center 100 generates information indicating that the driver has been changed. When the data center 100 determines that the amount of change in mode time per unit time is equal to or less than the threshold value B, and the mode time shows a decreasing trend from a predetermined point in time in the past, the data center 100 generates information indicating that the level of proficiency in driving has increased. Alternatively, when the data center 100 determines that the amount of change in mode time per unit time is equal to or less than the threshold value B, and the mode time shows an increasing trend from the predetermined time in the past, the data center 100 generates information indicating that the level of proficiency in driving has decreased. The predetermined point in time in the past may be, for example, when the driver was changed most recently or when the vehicle started driving. The data center 100 may calculate the rate of increase in mode time from the predetermined point in time in the past as a rate of decrease in level of proficiency in driving, and may calculate the rate of decrease in mode time from the predetermined point in time in the past as a rate of increase in level of proficiency in driving.

The data center 100 may generate information indicating that the level of proficiency in driving has decreased or increased when, for example, the magnitude of the rate of decrease in level of proficiency in driving or the rate of increase in level of proficiency in driving is larger than a threshold value.

The operation of the brake ECU 20, namely the vehicle information processing device in this modification, based on the above structure and flowchart will be described.

For example, it is assumed that the brake pedal is being depressed to decelerate the vehicle 2 while the vehicle 2 is moving. At this time, data corresponding to the input information is acquired (S200), and it is determined whether the predetermined condition is satisfied (S202). For example, when brake lights of a vehicle ahead turn off and the distance to the vehicle ahead is increasing, it is determined that the predetermined condition is satisfied (YES in S202), and the AB foot transfer time is calculated when the driver transfers his or her foot from the brake pedal to the accelerator pedal (S204).

When the AB foot transfer time is calculated, the calculated AB foot transfer time is added as added data (S206), and the mode time is calculated using the resultant data (S208).

When the mode time is calculated, the amount of change in mode time per unit time is calculated. When the magnitude of the amount of change in mode time per unit time is larger than the threshold value B, this corresponds to the state in which the mode time has changed suddenly, and information indicating that the driver has been changed is generated. The generated information for determining a driver change history due to the sudden change in mode time is output to the central ECU 40.

On the other hand, when the magnitude of the amount of change in mode time per unit time is equal to or less than the threshold value B and the mode time shows a decreasing trend from the predetermined point in time in the past, this corresponds to the state in which the mode time has decreased gradually, and information indicating that the level of proficiency in driving has increased is generated. When the magnitude of the amount of change in mode time per unit time is equal to or less than the threshold value B and the mode time shows an increasing trend from the predetermined point in time in the past, this corresponds to the state in which the mode time has increased gradually, and information indicating that the level of proficiency in driving has decreased is generated.

As described above, according to the vehicle information processing device of this modification, the mode time, namely the feature, is calculated using the input information received during the period in which the predetermined condition is satisfied. The feature can thus be calculated by excluding at least a part of the input information containing noise caused by the disturbance and how the vehicle is driven. Therefore, the feature related to the operation of the vehicle can be accurately calculated as compared to the case where the feature is calculated using the input information received during the entire period in which the vehicle information processing device receives input information.

Moreover, information that is valuable to the user regarding a change of the vehicle such as a driver change history or a driver's driving proficiency level history can be calculated using information on a change in feature (mode time) indicating the level of proficiency in driving over time such as a sudden change or gradual change.

In this modification, the AB foot transfer time is described as including the foot transfer time from the accelerator pedal to the brake pedal and the foot transfer time from the brake pedal to the accelerator pedal. However, the AB foot transfer time may include only the foot transfer time from the accelerator pedal to the brake pedal, or may include only the foot transfer time from the brake pedal to the accelerator pedal. Alternatively, the mode time of the foot transfer time from the accelerator pedal to the brake pedal and the mode time of the foot transfer time from the brake pedal to the accelerator pedal may be calculated separately.

In this modification, the amount of change in mode time per unit time is calculated. However, for example, the amount of change in mode time per unit traveled distance may be calculated.

A part or all of the above modifications may combined as appropriate.

The embodiment disclosed herein should be construed as illustrative, not restrictive, in all respects. The scope of the present disclosure is shown by the claims rather than by the above description and is intended to include all modifications within the meaning and scope equivalent to the claims.

What is claimed is:

1. A vehicle information processing device configured to notify of deterioration of a tire of a vehicle, the vehicle information processing device comprising:
   one or more processors programmed to:
   access driving operation information indicating at least one of a depression amount of an accelerator pedal of the vehicle and a depression amount of a brake pedal of the vehicle;
   access vehicle state information including wheel speed information received from a drive wheel speed sensor and a driven wheel speed sensor, steering angle information received from a steering angle sensor, and acceleration information;
   based on the accessed vehicle state information, steering angle information, and acceleration information, determine whether a predetermined condition exists, the predetermined condition existing in a state in which the vehicle is i) in a gradual turn and ii) slowly accelerating or decelerating, and the predetermined condition not existing in a state in which the vehicle is i) not turning or ii) not accelerating or decelerating; and
   only during a time period in which the predetermined condition exists, calculate a slip ratio between a drive wheel and a driven wheel;
   using the calculated slip ratio, calculate a linear approximation of a change in the slip ratio; and
   based on the calculated linear approximation, output a notification of the deterioration of the tire.

2. The vehicle information processing device according to claim 1, wherein the calculated linear approximation indicates a change in the slip ratio with respect to a driving force of the vehicle during the time period in which the predetermined condition exists.

3. The vehicle information processing device according to claim 1, wherein the one or more processors are programmed to, based on the calculated linear approximation, output information on a replacement history of the tire due to a sudden change in the slip ratio with respect to a driving force of the vehicle.

4. The vehicle information processing device according to claim 1, wherein the one or more processors are programmed to output the notification to an outside of the vehicle.

5. A vehicle information processing method for notify of deterioration of a tire of a vehicle, the vehicle information processing method comprising:

accessing driving operation information indicating at least one of a depression amount of an accelerator pedal of the vehicle and a depression amount of a brake pedal of the vehicle;

accessing vehicle state information including wheel speed information received from a drive wheel speed sensor and a driven wheel speed sensor, steering angle information received from a steering angle sensor, and acceleration information;

based on the accessed vehicle state information, steering angle information, and acceleration information, determining whether a predetermined condition exists, the predetermined condition existing in a state in which the vehicle is i) in a gradual turn and ii) slowly accelerating or decelerating, and the predetermined condition not existing in a state in which the vehicle is i) not turning or ii) not accelerating or decelerating; and only during a time period in which the predetermined condition exists, calculating a slip ratio between a drive wheel and a driven wheel;

using the calculated slip ratio, calculating a linear approximation of a change in the slip ratio; and based on the calculated linear approximation, outputting a notification of the deterioration of the tire.

6. A non-transitory storage medium storing instructions that are executable by one or more processors in a computer and that cause the one or more processors to perform functions comprising:

accessing driving operation information indicating at least one of a depression amount of an accelerator pedal of a vehicle and a depression amount of a brake pedal of the vehicle;

accessing vehicle state information including wheel speed information received from a drive wheel speed sensor and a driven wheel speed sensor, steering angle information received from a steering angle sensor, and acceleration information;

based on the accessed vehicle state information, steering angle information, and acceleration information, determining whether a predetermined condition exists, the predetermined condition existing in a state in which the vehicle is i) in a gradual turn and ii) slowly accelerating or decelerating, and the predetermined condition not existing in a state in which the vehicle is i) not turning or ii) not accelerating or decelerating; and only during a time period in which the predetermined condition exists, calculating a slip ratio between a drive wheel and a driven wheel;

using the calculated slip ratio, calculating a linear approximation of a change in the slip ratio; and based on the calculated linear approximation, outputting a notification of a deterioration of a tire.

\* \* \* \* \*